July 20, 1965 J. P. CASEY ETAL 3,196,215

TRANSDUCER HEAD LOCKING MEANS

Filed Nov. 17, 1960

INVENTORS
JAMES P. CASEY &
BY MERTON L. RIPLEY
James H. Bower
ATTORNEY

United States Patent Office 3,196,215
Patented July 20, 1965

3,196,215
TRANSDUCER HEAD LOCKING MEANS

James P. Casey, 760 Spring Drive, Northville, Mich., and Merton L. Ripley, 865 Duke Road, Milford, Mich.

Filed Nov. 17, 1960, Ser. No. 70,043
11 Claims. (Cl. 179—100.2)

This invention relates to magnetic data storage devices in general and, in particular, to a new and novel means of securing a magnetic transducer head such as that used for recording, reading and/or erasing information in the form of magnetic bits on a magnetic coated surface having relative motion to the head.

In magnetic data storage devices of the type which have a generally movable record body with a magnetizable surface layer and one or more transducer heads positioned adjacent thereto, it is necessary to securely hold the transducer head so that a predetermined air-gap spacing may be maintained during operation of the system. The securing means must not damage the head's surface or shape by marring or deforming. There must also be a means provided to adjust the relative position between the said heads to obtain proper timing and synchronizing of the recording and/or reading. Therefore, it is an object of the present invention to provide a securing means simple in construction, and easily and quickly secured and loosensed for adjustment, removing, or replacing of the transducer head.

A further object is to provide a device so constructed that there will not be a concentration of force at a localized point on the transducer head surface but uniform pressure on nearly the entire surface.

Another object of the present invention is to provide means for quick and sure relative positioning between the transducer heads.

Also, the objects of the present invention include the provision of a structure capable of accomplishing the above objects with a minimum of material cost and fabricating expense, and at the same time being composed of simple and ruggedly constructed elements which are very reliable in operation.

Other objects and advantages of the invention will be apparent from the following detailed description and claims, taken in connection with the accompanying drawings which form part of the instant specification, and which are to be read in conjunction therewith, and in which like reference numerals are used to indicate like parts in various views.

Figure 1:
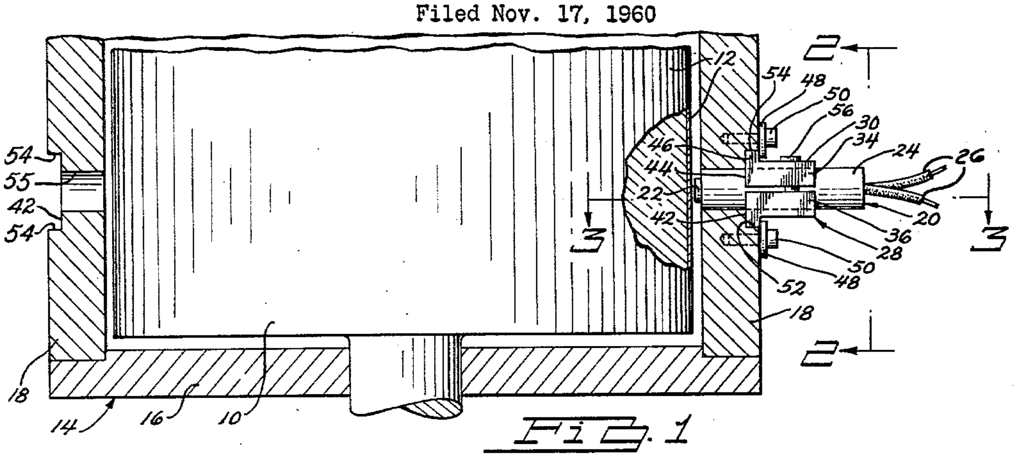
FIG. 1 is a side elevation view, partially in section, of a magnetic drum system embodying a preferred form of the present invention.
Figure 2:
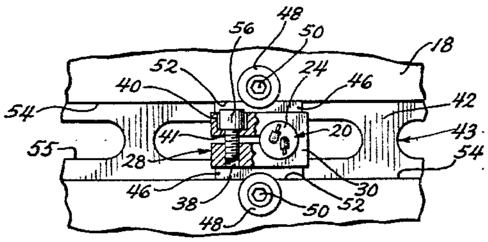
FIG. 2 is a top plan view taken along the line 2—2 of FIG. 1, showing a portion of the mounting bracket and the securing means on that portion.
Figure 3:
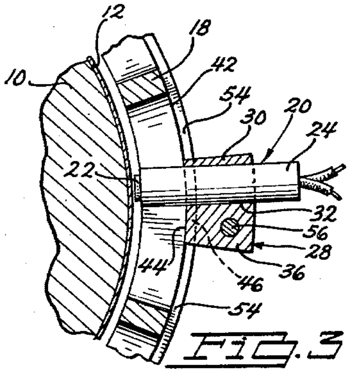
FIG. 3 is an elevation view, partially in section, taken along the line 3—3 of FIG. 1.

Referring to the drawings, in FIGS. 1 and 2, reference numeral 10 indicates a movable magnetic data recording drum having a magnetizable surface 12, such as is well known in the art. Associated with the drum 10 is a housing or support 14 with an end member 16 and a cylindrical body 18 as shown. The housing body 18, in actual practice, holds a plurality of magnetic transducer heads but, for the sake of simplifying the description of our invention, only one is shown and designated by numeral 20. These transducer heads could be of a multiple number of elongated shapes but, for the present disclosure, only a cylindrical form is discussed. At the end of head 20 adjacent the record surface 12 are pole pieces 22 forming a flux-defining gap. The transducer head 20 has a body portion 24 with suitable electrical leads 26 provided for the magnetic pole pieces 22.

Figure 4:
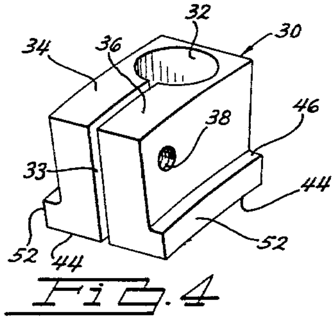
FIG. 4 is a perspective view of the preferred securing means as shown in FIGS. 1, 2 and 3, with the resilient gap vertical to the magnetic record surface.

The new transducer head locking and holding means 28 which is disclosed in the present application includes a head holding block 30. As shown in FIG. 4, the block 30 has a transducer head opening or aperture 32 which is all the way through the block 30 and perpendicular to the recording surface 12. The block 30 is bifurcated by means of a slit 33 extending all the way to aperture 32 and thus defining fork members 34 and 36. Fork members 34 and 36 have smooth and threaded bores 38 and 40 respectively. Bore 40 has a bolt head locating surface 41 as seen in FIG. 2. The outside surface of the housing body 18 is provided with peripheral channels 43 having a bottom machined surface 42 and sidewall surfaces 54. An elongated slot 55 extends all the way through to the interior of the housing body 18 to afford a passage to the body portion 24 of the transducer head 20 projecting therethrough. The block 30 is normally engaged in the channel 43 so that its bearing surface 44 engages the bottom surface 42 of the channel. The block 30 has flange 52 provided with clamping surfaces 46 which are acted upon by clamping washers 48 secured by bolts 50 threaded into body 18 as seen in FIGS. 1 and 2. As seen in FIG. 1, the height of flanges 52 of block 30 is slightly larger than the height of sidewalls 54 to allow the washer 48 to engage surfaces 46 and hold block 30 in position along channel 43. To reposition block 30, bolts 50 are loosensed and the block is merely slid along channel 43. There are threaded bores which are not shown in the drawings, along the channel 43 to hold bolts 50 to secure the block 30. The resilient gap defined by slit 33 is the distance between the two fork members 34 and 36. The compression means in the present disclosure is a bolt 56, as seen in FIGS. 1 and 2, which enters bore 40 and screws into threaded bore 38. The head of bolt 56 engages locating surface 41 of bore 40 and continued turning of the bolt 56 into bore 38 causes fork members 34 and 36 to be drawn together, thus securing head 20 in the head holding block 30. This allows for quick and positive securing of the transducer head 20 without damage to its body portion 24 because of the overall pressure exerted by transducer head opening 32 on the said body portion.

Figure 5:
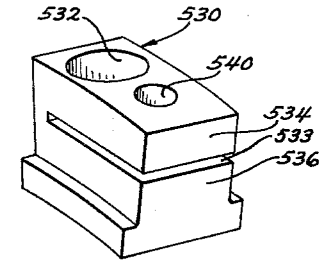
FIG. 5 is a perspective view of a modification of the preferred securing means as shown in FIG. 4 with the resilient gap horizontal to the magnetic record surface.

Head holding block 530, as seen in FIG. 5, has the same holding means for being secured in channel 43 as block 30, but the slit 533 defining the resilient gap is not parallel to the transducer head opening 532 as is slit 33 defining the resilient gap in FIG. 4 to opening 32. The resilient gap defined by slit 533 in FIG. 5 is perpendicular to the axis of aperture or opening 532. This allows for simplified securing of a transducer head 20 from above the block due to the fact that the bolt 56 will enter through bore 540 as seen in FIG. 5.

Figure 6:
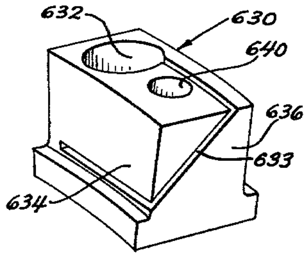
FIG. 6 is a perspective view of a modification of the preferred securing means as shown in FIG. 4 with the resilient gap oblique to the magnetic record surface and the compressing means perpendicular to the record surface.
Figure 7:
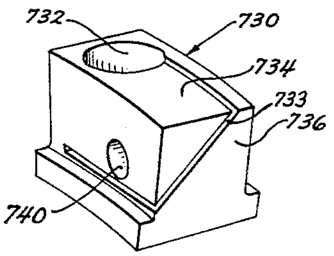
FIG. 7 is similar to FIG. 6 with the compressing means parallel to the record surface.

FIG. 6 shows a head holding block 630 which is another embodiment of our invention. The resilient gap is oblique to transducer head opening 632 and is formed by slit 633 and fork members 634 and 636. This allows bolt 56 to enter from above through smooth bore 640 causing an overall pressure to be exerted by opening 632 on transducer head 20. FIG. 7 is similar to FIG. 6 with the resilient gap, formed by slit 733 and fork members 734 and 736, also oblique to the transducer head opening 732 in block 730. This allows the bolt 56 to enter the block from the side through smooth bore 740 causing an overall pressure to be exerted by opening 732 on transducer head 20. The design of blocks 630 and 730 are exactly the same except for the positioning of the smooth and threaded bores. Certain situations make it necessary for the compressing bolt to enter the block either from above or from the side. Therefore, the blocks 630 and 730 have the advantage that they can be manufactured at the same time without the smooth or threaded bores, these being added as dictated by specific customer requirements.

Figure 8:
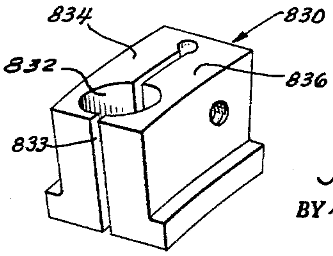
FIG. 8 is a perspective view of a modification of the preferred securing means as shown in FIG. 4 with the resilient gap vertical to the magnetic record surface and on both sides of the transducer head opening. The transducer head opening is between the compressing means, which is parallel to the magnetic record surface, and the open end of the head holding block.

FIG. 8 shows another embodiment represented by head holding block 830. The resilient gap, defined by slit 833 and fork members 834 and 836, is parallel to the transducer head opening 832 and on both sides of it, as seen in FIG. 8. This allows the compressor bolt 56 to enter from the side and cause overall pressure to be exerted by opening 832 on transducer head 20. The block 830 is adapted to be held in channel 43 in a manner similar to block 30.

It will be understood that various changes may be made in details within the scope of our claims without departing from the spirit of our invention. It is therefore to be understood that our invention is not to be limited to the specific details shown and described.

We claim:

1. In a magnetic data storage apparatus having a magnetizable record surface on a drum member movable in relation to a stationary housing member and at least one elongated cylindrical transducer head of circular cross section adapted to be adjustably mounted on said housing member with its pole pieces forming a flux deflecting gap in close proximity to said record surface for recording on and playback from said record surface, an improved transducer head setting and locking device comprising:

a peripheral channel having an axis substantially aligned with the direction of motion of said second surface on the outer surface of said housing member, said peripheral channel having a bottom surface substantially parallel to said record surface and two sidewall surfaces;

a slot extending all the way from the bottom surface of said channel to the interior of said housing member defining annular planes substantially orthogonal to said record surface;

a block with a bearing surface adapted to abut against said bottom surface of said channel;

flange portions integral with said block and adapted to lie between the sidewall surfaces of said channel;

means cooperating with said flange portions for clamping said block in said channel;

an aperture in said block for accepting the cylindrical body of the transducer head projecting through the slot in said channel, the axis of said aperture being substantially perpendicular to said record surface;

a slit in said block extending all the way to said aperture and defining two bifurcated portions;

and means for drawing together said bifurcated portions to cause said transducer head body to be securely clamped in position by elastic deformation of said aperture;

whereby the distance between the pole pieces of the transducer head and the record surface is adjustable by longitudinal sliding of the transducer body in the aperture in the block and the alignment of the transducer head flux deflecting gap is adjustably by rotation of said transducer body in the aperture in said block before clamping therein, and the radial position of the block is adjustable by sliding in the channel before clamping therein.

2. A device as defined in claim 1 wherein the slit in said block is substantially parallel to the axis of the aperture in said block.

3. A device as defined in claim 1 wherein the slit in said block is substantially normal to the axis of the aperture in said block.

4. A device as defined in claim 1 wherein the slit in said block is substantially oblique in relation to the axis of the aperture in said block.

5. A device as defined in claim 1 wherein the means drawing together the bifurcated portions of said block is a threaded member introduced through a smooth bore in one of said portions and threading into a threaded bore in the other of said portions, said threaded member having an enlarged head portion for engagement with a surface of said first mentioned portion for drawing both said portions together when said threaded member is tightened.

6. A device as defined in claim 1 wherein the means clamping the block in the channel comprises washers bearing on the surfaces of the flange portions of said block projecting above the surface of said housing member, said washers being drawn in clamping position therewith by means of hold down screws threading in said housing member.

7. In a magnetic data storage apparatus having a magnetizable record surface movable in relation to a stationary member and at least one elongated cylindrical transducer head of circular cross section adapted to be adjustably mounted on said stationary member with its pole pieces in close proximity to said record surface for recording on and playback from said record surface, an improved transducer head setting and locking device comprising:

a channel on the outer surface of said stationary member, said channel being substantially aligned with the direction of motion of said record surface and having a bottom surface substantially parallel to said record surface;

a block with a bearing surface adapted to abut against said bottom surface of the channel;

means clamping said block in said channel;

an aperture in said block for accepting the cylindrical body of the transducer head with its axis substantially perpendicular to said record surface;

a slot in the bottom surface of said channel to afford passage to said transducer head body through said stationary member;

a slit in said block extending all the way to said aperture and defining two bifurcated portions;

and means for drawing together said bifurcated portions to cause said transducer head body to be securely clamped in position by elastic deformation of said aperture;

whereby said transducer head body is longitudinally and rotatably slidable in said aperture for adjustment of its pole pieces in proximity to the record surface, and the block is slidable in the channel for adjustment of its position in said stationary member.

8. A device as defined in claim 7 wherein the slit in said block is substantially parallel to the axis of the aperture in said block.

9. A device as defined in claim 7 wherein the slit in said block is substantially normal to the axis of the aperture in said block.

10. A device as defined in claim 7 wherein the slit in said block is substantially oblique in relation to the axis of the aperture in said block.

11. A device as defined in claim 7 wherein the means drawing together the bifurcated portions of said block is a threaded member introduced through a smooth bore in one of said portions and threading into a threaded bore in the other of said portions, said threaded member having an enlarged head portion for engagement with a surface of said first mentioned portion for drawing both said portions together when said threaded member is tightened.

References Cited by the Examiner

UNITED STATES PATENTS

| | | | |
|---|---|---|---|
| 1,366,617 | 1/21 | Wier et al. | 179—100.2 |
| 1,368,683 | 2/21 | Anderson | 269—287 X |
| 1,372,665 | 3/21 | Alexander | 269—287 X |
| 1,507,274 | 9/24 | Curtis | 269—288 X |
| 2,820,688 | 1/58 | Philbrick | 346—74 |
| 2,905,933 | 9/59 | Canepa | 179—100.2 |
| 2,943,860 | 7/60 | Darcy | 179—100.2 |
| 3,133,159 | 5/64 | Johnson. | |

IRVING L. SRAGOW, *Primary Examiner.*

STEPHEN W. CAPELLI, *Examiner.*